United States Patent [19]

Cook, Jr.

[11] Patent Number: 4,750,285
[45] Date of Patent: Jun. 14, 1988

[54] HOOK CAPTURING DEVICE FOR LONGLINE HAULING APPARATUS

[75] Inventor: Harold T. Cook, Jr., Bainbridge Island, Wash.

[73] Assignee: Marco Seattle, Inc., Seattle, Wash.

[21] Appl. No.: 851,324

[22] Filed: Apr. 11, 1986

[51] Int. Cl.$^4$ .............................................. A01K 91/00
[52] U.S. Cl. ............................................ 43/6.5; 43/4; 43/27.4
[58] Field of Search ....................... 43/4, 4.5, 6.5, 27.4

[56] References Cited

U.S. PATENT DOCUMENTS

| | | | |
|---|---|---|---|
| 1,768,981 | 7/1930 | Henrikson | 43/57.3 |
| 3,377,733 | 4/1968 | Godo | |
| 4,107,865 | 8/1978 | Alex | 43/27.4 |
| 4,266,359 | 5/1981 | Alex | 43/6.5 |
| 4,461,112 | 7/1984 | Jacobsen | 43/4 |
| 4,505,062 | 3/1985 | Cook | 43/6.5 |

FOREIGN PATENT DOCUMENTS

| | | |
|---|---|---|
| 0082126 | 6/1983 | European Pat. Off. |
| 71712 | 2/1947 | Norway. |
| 104806 | 9/1964 | Norway ............................. 43/27.4 |
| 117155 | 7/1969 | Norway. |
| 128388 | 12/1973 | Norway. |
| 2124863 | 2/1984 | United Kingdom. |

Primary Examiner—Kurt Rowan
Attorney, Agent, or Firm—Christensen, O'Connor, Johnson & Kindness

[57] ABSTRACT

A device for capturing hooks for use in conjunction with longline hauling and stowage apparatus includes a hook elevating ramp, an engagement plate, and a brush. The hook elevating ramp elevates the hook to the location of the guide track by which the hook is to be captured for storage, while the engagement plate rotates the hook to ensure its engagement on the guide track. The brush serves to stabilize the hook immediately prior to and during hook rotation.

18 Claims, 4 Drawing Sheets

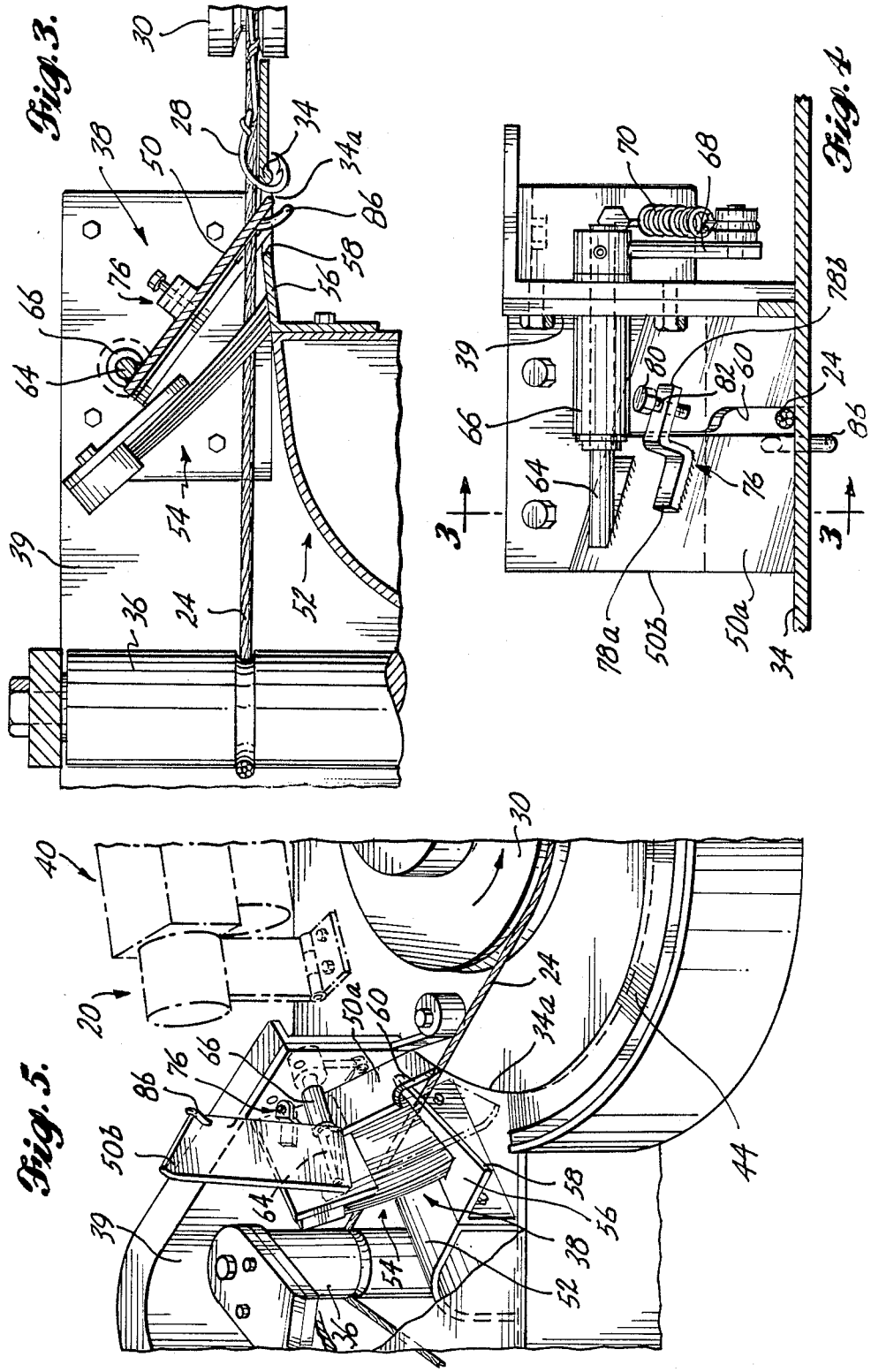

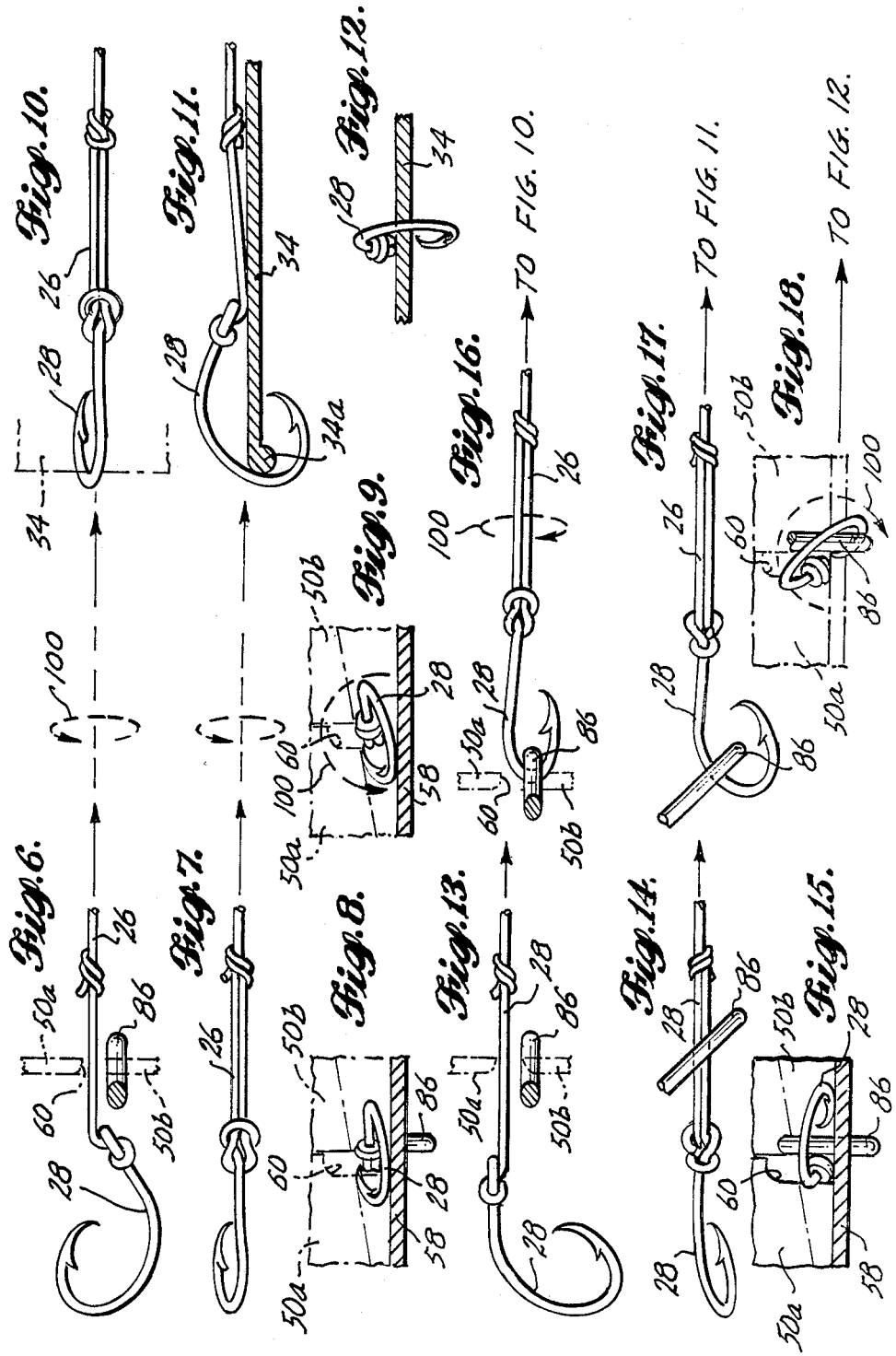

HOOK CAPTURING DEVICE FOR LONGLINE HAULING APPARATUS

This invention relates to improved longline hauling apparatus useful in bottom fishing and particularly to apparatus for hauling longline equipped with hooks.

Longlines utilized in fishing include a ground line, a continuous line typically running from 2,000 to 10,000 feet long, equipped with a plurality of gangions that are spaced at intervals along the ground line. Hooks are affixed to the free ends of the gangions. A longline hauling and stowage apparatus of the type typically employed today is disclosed in U.S. Pat. No. 4,505,062 issued to Harold T. Cook, Jr. The longline hauling and stowage apparatus is designed to capture and stow longlines equipped with conventional J hooks. While conventional J hooks are widely used, the circle hook has recently been gaining in popularity among fishermen. The circle hook differs from the conventional J hook in that its bend is much larger, relative to the length of the shank, and the point is curved so that in plan view the point is oriented nearly orthogonally to the shank as opposed to being parallel as it is in a conventional J hook. In addition, viewing the circle hook longitudinally, that is, viewed in the direction of the shank, the hook is offset from the shank. The capturing portion of the longline hauling and stowing apparatus disclosed in the aforementioned Cook patent, while having the capability of capturing circle hooks, does not do so optimally.

SUMMARY OF THE INVENTION

In its preferred form, the present invention, therefore, provides an improved means for capturing circle hooks so that the ground line, gangions and hooks can be stowed in an orderly manner for ready redeployment. The improved hook capturing means is intended in its preferred embodiment to be employed with an apparatus for retrieving longlines that includes a means for moving a ground line along an advancement path and a hook guide track positioned adjacent the advancement path for capturing and guiding hooks along a guide path defined by the guide track. In this preferred embodiment, the guide track has an initial portion spaced from and nonparallel with the advancement path and a primary portion smoothly joined with said initial portion and running adjacent to the advancement path. The improved hook capturing means is located immediately upstream from the initial portion of the guide track and comprises a hook turning means upstream from and adjacent the initial portion of the guide track for orienting the hook such that the shank passes between the guide track and the advancement path, and such that the point passes on the side of the guide track opposite from the advancement path, thereby allowing the guide track to engage the interior of the hook bend and capture the hook. The hook turning means defines a hook engaging surface having a first edge defining a portion of the boundary of the surface. The first edge terminates adjacent the side of the guide track opposite from the advancement path. The surface extends upstream from the first edge and adjacent the advancement path and defines a slot extending from the first edge to and through the advancement path.

In operation, the ground line is hauled by the means for moving the ground line so that the ground line and gangions travel through the slot defined by the hook engaging surface. As a gangion passes through the slot, the hook is pulled toward the hook engaging surface. Since the hook engaging surface is upstream from the guide track, the hook engaging surface causes the hook to rotate in reaction to the forward advancement of the hook so that, as the hook reaches the location of the guide track, the point of the hook has been turned away from the advancement path and passes the side of the guide track opposite from the advancement path. In the preferred embodiment, the guide track is positioned below the advancement path so that the hook point is turned down by the hook engaging surface with the assistance of gravity.

BRIEF DESCRIPTION OF THE DRAWINGS

A better understanding of the present invention can be derived by reading the accompanying drawings in conjunction with the ensuing specification, wherein:

FIG. 3 is a side elevation view of the improved circle hook capturing apparatus taken along section line 3—3 of FIG. 1;

FIG. 4 is an upstream view of the improved circle hook capturing apparatus taken along section line 4—4 of FIG. 1;

FIG. 5 is an isometric view of the improved circle hook capturing apparatus similar to FIG. 2, showing the snag release feature of the improved circle hook capturing apparatus;

FIG. 6 through 8 are plan, side and end views showing the circle hook point to the left of the shank prior to engaging the improved circle hook capturing apparatus;

FIG. 9 is an end view showing the circle hook with the point to the left of the shank engaging the improved hook capturing apparatus;

FIGS. 10 through 12 are plan, side and end views of the circle hook after it has been turned and engages the side track;

FIGS. 13 through 15 are plan, side and end views showing the circle hook point to the right of the shank prior to engaging the improved circle hook capturing apparatus;

FIGS. 16 through 18 are plan, side and end views showing the circle hook with the point to the right of the shank engaging the improved circle hook capturing apparatus.

DETAILED DESCRIPTION OF THE INVENTION

Figure 1:
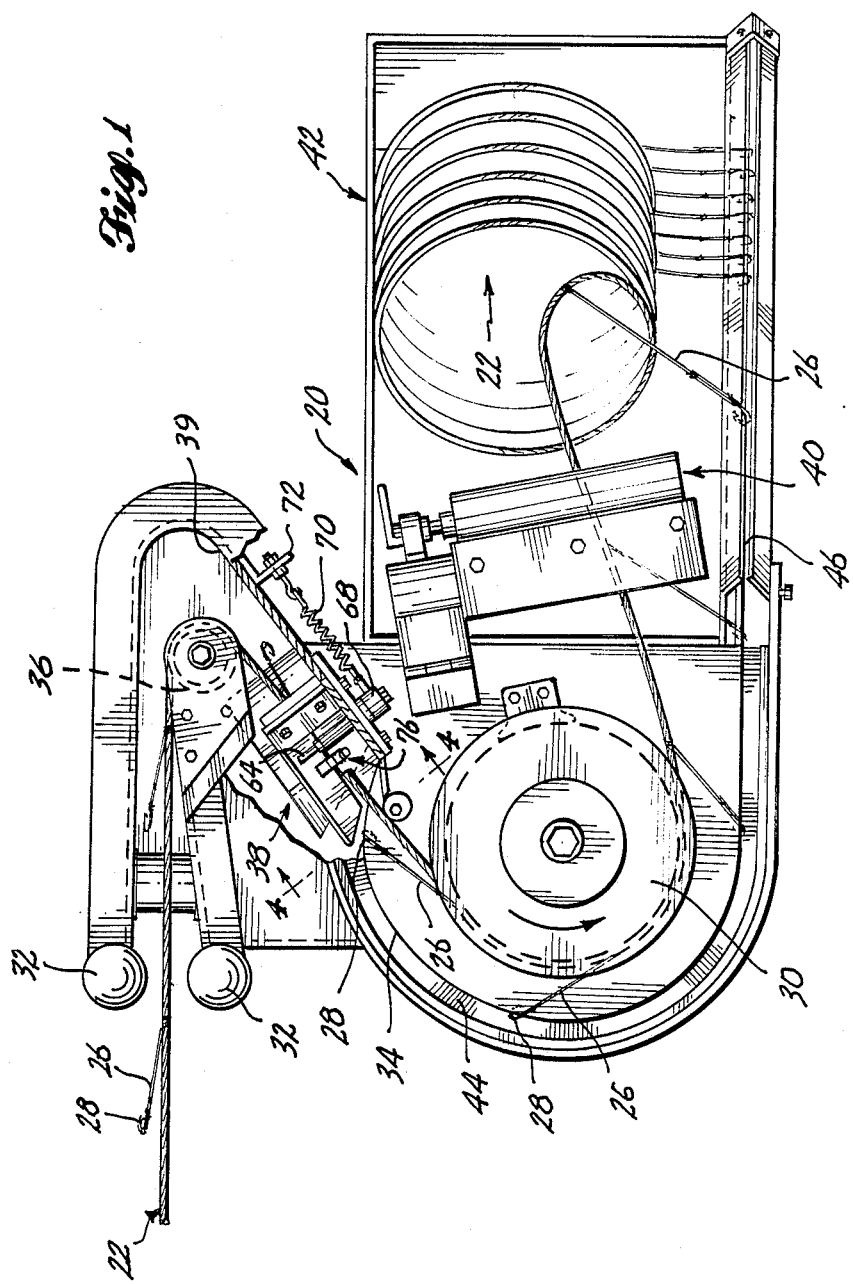
FIG. 1 is a plan view of a hauling and stowage apparatus employing the improved circle hook capturing apparatus of the present invention.
Figure 2:
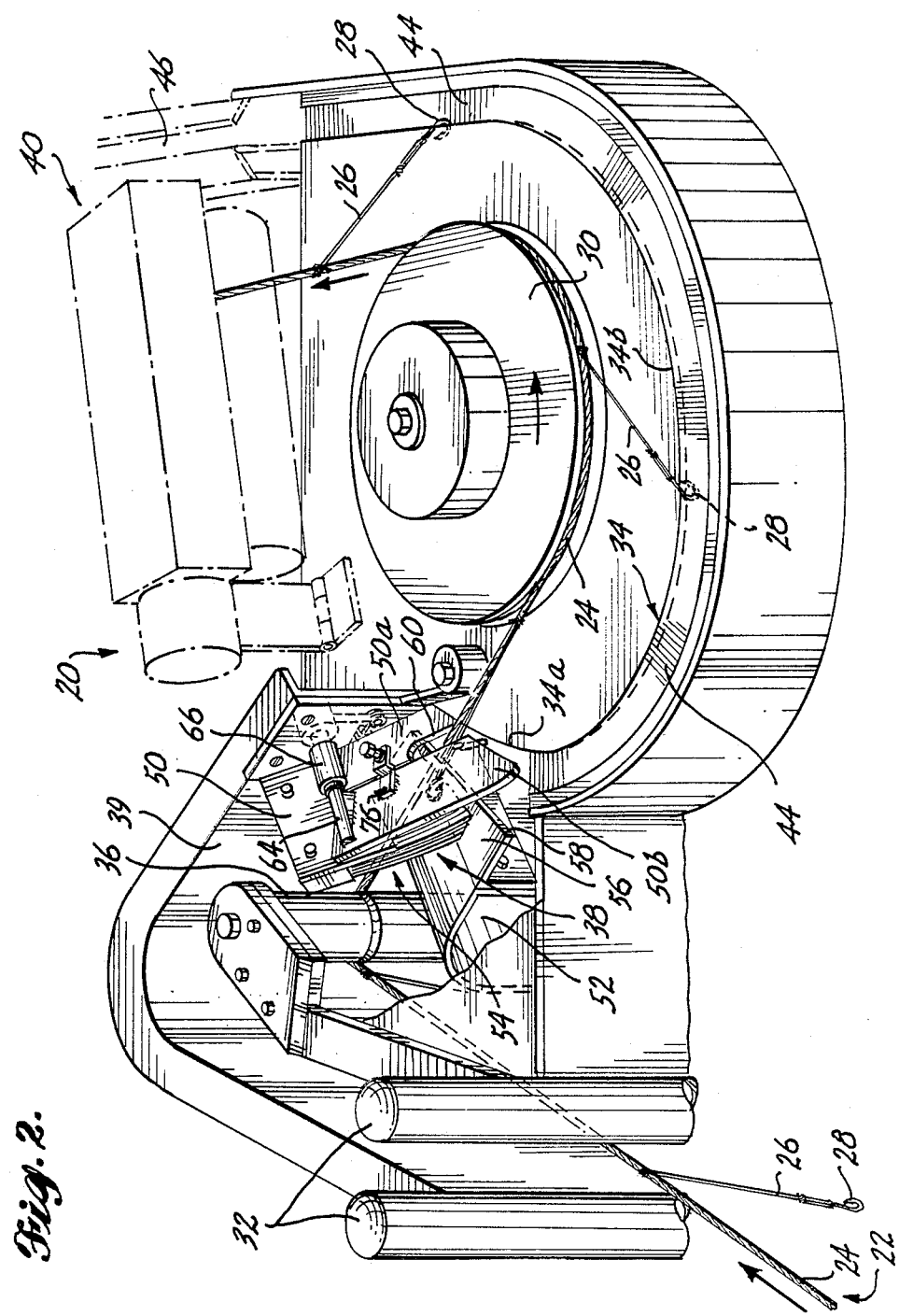
FIG. 2 is an isometric view of the improved circle hook capturing apparatus.

Referring first to FIGS. 1 and 2, the hauling and stowage apparatus, generally designated 20, is employed to retrieve a longline 22, made up of the ground line 24, to which are attached a plurality of gangions 26. Circle hooks 28 are affixed to the free ends of the gangions. The ground line engages a hauler sheave 30 that advances the ground line, first between a pair of entracne guide members 32 (left and right respectively when viewed in a downstream direction), which are normally employed to remove fish from the hooks. The ground line then traverses an idler sheave 36, from which it travels in a generally straight advancement path to the hauler sheave 30. A circle hook turning device 38 is positioned between the idler sheave 36 and the hauler sheave 30. Prior to the time the hook engages the hook turning device 38, the hook and gangion hang freely from the ground line. Once passing the hook turning device 38, the hook 28 engages the guide track 34, the edge of which defines in plan view a guide surface. The guide track is preferably positioned below the advancement path of the ground line, and in plan view has an initial portion which first intersects the advancement path of the ground line and gradually curves into a primary portion 34b that is generally equidistantly spaced from the ground line as it traverses a portion of the circumference of the hauler sheave 30.

Once passing the hauler sheave 30, the ground line 24 is picked up by a pair of nip rolls 40, which pull the ground line from the hauler sheave 30 and deposit it in a stowage bin 42. While the ground line traverses the hauler sheave 30 and the nip rolls 40, the hook 28 remains engaged with the guide track 34 and is maintained in engagement with the guide track via an arcuate brush 44, having bristles that are oriented perpendicularly to the guide track. The hook traverses from the guide track 34 onto a stowage track 46 that is detachable from the hauling device, along with the stowage bin 42. The apparatus thus serves to retrieve the longline 22 and dispose the longline in coils in the stowage bin in an orderly manner so that it can be deployed without delay because of fouled hooks or tangled gangions. While the invention is disclosed in conjunction with a primary line hauler for retrieving a longline, the invention will function equally well with a secondary hauler used primarily to pick line from the deck of a ship and coil it in a storage bin.

Referring now, conjunctively, to FIGS. 2, 3 and 4, the hook turning device 38 is positioned immediately upstream from the initial portion 34a of the guide track. The hook turning device 38 is mounted on a vertically oriented wall 39 that is positioned on the left side of the ground line advancement path when viewing in a downstream direction. The wall 39 is spaced from the advancement path. In its preferred embodiment, the hook capturing device includes a hook engagement plate 50, having a left-hand section 50a and a right-hand section 50b when viewed in a downstream direction. The remaining components of the hook capturing device are a hook elevating ramp 52 positioned below the ground line advancement path, and a brush 54 having bristles that extend from a location above the ground line advancement path at an angle downstream and downwardly, so that the edges of the bristles project below the advancement path and engage the upper surface of the hook elevating ramp 52. The bristles of the brush 54 terminate upstream from the lower edge of the hook engagement plate.

The hook elevating ramp 52 is also affixed to the vertical wall 39, but at a location below the hook engagement plate 50. The elevating ramp 52 extends from a position well below the ground line advancement path in a smooth curve upwardly and in a downstream direction. The hook 28 dangling from a gangion 26 engages the hook elevating ramp 52 as the gangion rounds the idler sheave 36. As the ground line advances, the elevating ramp elevates the hook to a location immediately below the ground line. A forward lip plate 56 forms a downstream extension of the elevating ramp 52 and terminates in a downstream edge 58 that lies upstream from the engagement plate 50 and is spaced upstream from the initial portion 34a of the guide track 34. Preferably, the downstream edge 58 of the lip plate 56 is horizontally spaced from the initial portion 34a of the guide track 34 by a distance slightly less than the length of a hook, that is, the distance from the hook eye to the hook bend. Preferably, the downstream edge 58 is spaced from the lower edge of the hook engagement plate 50 by only a distance sufficient to allow the hook point to rotate downwardly as it engages the engagement plate.

The primary function of the ramp is to elevate or present the hook at the level of the guide track prior to engaging the engagement plate. Alternatively, a horizontal plate can be substituted for the ramp if the line forwarding apparatus is constructed so that the hook is already presented at the guide track level.

As the ground line, gangion and hook advance to the top of the elevating ramp 52, the ground line and the gangion pass through the bristles of the brush 54. Bristles of the brush 54 serve especially to contain the gangion, and thus the hook, in close engagement with the elevating ramp 52 and the upper surface of the forward lip plate 56. In this manner, the hook is prevented from flying above the ground line advancement path, which might cause it to improperly engage with the hook engagement plate 50 or become entangled in the ground line. The brush also causes a hook that approaches it with the shank on the ramp, but the point in the air, to rotate one way or the other so that the hook lies flat on the ramp prior to contacting the engagement plate. A strong magnet positioned under the ramp at the brush location can function as a substitute for the brush.

The hook engagement plate 50 comprises a left-hand section 50a and a right-hand section 50b. In its preferred embodiment, the left-hand section 50a has a lower edge that lies adjacent and parallel to and is in intimate contact with the initial portion 34a of the guide track 34. A slot 60 is formed in the hook engagement plate between the left-hand section 50a and the right-hand section 50b. The lower edge of the right-hand section 50b of the hook engagement plate 50, positioned adjacent the initial portion 34a of the guide track 34, is spaced from the guide track by a distance sufficient to let the bend of the hook 28 pass in an unrestricted manner between the lower edge of the right-hand section and the surface of the guide track 34. From their lower edges, both sections 50a and 50b extend upwardly and in an upstream direction. Thus, the upstream face of the sections 50a and 50b presents a hook engaging surface of the hook engaging plate 50 that extends from a location above the ground line advancement path, downwardly and in a downstream direction.

The slot 60 is sufficiently wide to allow the ground line and gangions to pass through the hook engagement plate 50, but is most preferably not wide enough to allow the hook 28 to pass through the slot when the hook point and shank are lying in a generally horizontal plane. That is, the width of the slot 60 is less than the distance across the hook bend. Thus, as the hook 28 is pulled up the elevating ramp 52, under the bristles of the brush 54, and onto the forward lip plate 56, it is lying in a generally horizontal position immediately upstream from the hook engaging surface of the engagement plate 50. As will be explained in more detail in conjunction with FIGS. 6 through 18, the hook 28, whether its point is lying to the left or the right of its shank, then engages the upstream surface of the engagement plate 50 and is rotated about its shank so that its point is then positioned below the lower edge of the initial portion 34a of the guide track 34, thus causing the hook to engage and be captured by the guide track. The engagement plate 50 is also canted from left to right in a downstream direction. This cant causes a hook that approaches the plate in a point up orientation to preferably rotate in a clockwise direction (looking downstream) as it contacts the engagement plate.

Occasionally, a gangion becomes knotted or material is not removed from the hook sufficiently to allow the gangion to pass through the slot 60 in the engagement plate 50 or the hook to be properly captured by the guide track 34. So that the gangions and hooks are not injured or destroyed, the right-hand section 50b of the engagement plate 50 is hinged so that the downstream edge can rotate upwardly, thus allowing a knotted gangion or other material affixed to the hook to bypass the hook engagement device. To hinge the right-hand section 50b, the upstream end is affixed to a rod 64 which, in turn, is journaled in a bearing 66 affixed to the upstream end of the left-hand section 50a. The rod 64 extends through the wall 39 upon which the hook capturing device 38 is mounted and projects from its opposite side. Referring to FIGS. 1, 2, 4 and 5, a radially and downwardly extending arm 68 is affixed to the portion of the rod 64 extending through the wall on the side opposite the hook capturing device. One end of a coiled tension spring 70 is affixed to the lower end of the arm 68. The other end of the coiled tension spring 70 is affixed to a bracket 72, which is in turn affixed to the wall 39 at a location upstream from the arm 68. In this manner the rod 64 is rotationally biased such that the lower edge of the right-hand section 50b is biased in a downward direction. The desired location of the lower edge of the section 50b is adjusted by a stop mechanism 74. As seen in FIG. 4, stop mechanism 74 comprises an arm 76 having one end 78a affixed to the forward surface of right-hand section 50b and a second end 78b that is elevated above the first end and that projects over the forward surface of left-hand section 50a. A screw 80 is threaded into an aperture 82 located adjacent the second end 78b of the arm 76. The aperture 82 is oriented so that the end of the screw 80 engages the upper surface of the left-hand section 50a. By rotating the screw 80, the location of the lower edge of the right-hand section 50b can be adjusted to position the lower edge in a desired location relative to the initial portion 34a of the guide track 34. In its preferred embodiment, the lower edge of the right-hand section 50b is positioned so that it is slightly below the midpoint of the downstream edge of the guide track 34.

As shown in FIG. 5, the right-hand section 50b is elevated, exposing the brush 54 that is positioned immediately upstream from the hook engagement plate 50. In this position, a knotted gangion, or a hook having material still engaging it, can clear the engagement plate without harming the gangion or the hook.

One of ordinary skill will recognize that a pair of rods, tines or stiff bristles can be substituted for the sections of the hook engagement plate 50 and would function nearly as well as the preferred embodiment just described. It is preferred, however, that a relatively broad engagement surface, such as that created by the upstream face at the hook engagement plate, be employed to optimize the turning of the hook to engage the guide track 34. The functioning of the engagement surface made up of the right-hand section 50b can be enhanced by positioning a projection 86 that extends below the hook engaging surface adjacent the slot 60 and immediately upstream from the lower edge of the right-hand section 50b. In its preferred embodiment, the projection 86 is in the form of a small rod having a diameter that is less than the distance across the bend of the hook and which extends slightly below the guide track. As will be described in more detail below in conjunction with FIGS. 13, 14 and 15, the projection aids in turning the hook 28 so that it properly engages the guide track 34 when the hook point is lying to the right-hand side of the hook shank upon entering the hook turning device 38.

Referring now to FIGS. 6, 7 and 8, a circle hook 28 is shown at a location laying atop the forward lip plate 56 with the point lying to the left of the shank just prior to engaging the upstream facing surface of the hook engagement plate 50. As the hook is pulled downstream by the gangion, the point engages the engagement surface as indicated in FIG. 9. As the hook continues downstream, the downwardly sloped engagement surface causes the hook to rotate in a counterclockwise direction as indicated by arrow 100, such that the tip of the point is brought to a location below the initial portion 34a of the guide track 34. As the gangion pulls the hook further downstream, the hook engages the guide track 34, as indicated in FIGS. 10, 11 and 12.

Referring now to FIGS. 13, 14 and 15, a circle hook 28 is shown with the point lying to the right of the shank. Because of the hook offset, when the point is to the right of the shank, the coaction of the upstream facing surface of the hook engagement plate 50 and the hook point will not always result in the hook point being rotated sufficiently so that it will properly engage the initial portion 34a of the guide track. Thus, the projection 86 is employed to engage the bend of the hook prior to the time that the point engages the engagement surface to begin rotating the hook well in advance of its arrival adjacent the guide track 34, as shown in FIGS. 16, 17 and 18. This prerotation will cause the hook to be rotated so that the coacting of the gangions and the hook eye riding over the edge of the guide track will not cause a reversing of the hook rotation. As a result, the point is fully rotated so that it is below the initial portion 34a of the guide track, thus allowing the hook to fully engage the guide track 34 as previously shown in FIGS. 10, 11 and 12.

The present invention has been described in conjunction with the preferred embodiment. One of ordinary skill will be able to effect various changes, alterations and substitutions of equivalents without departing from the basic concepts disclosed herein. For example, while the invention has been described in conjunction with capturing of circle hooks, it will function equally well to capture the conventional J hook. It is therefore intended that the Letters Patent issued hereon be limited only by the definition contained in the appended claims and the equivalents thereof.

The embodiments of the invention in which an exclusive property or privilege is claimed are defined as follows:

1. In an apparatus for handling longline, said longline including a ground line, a plurality of gangions affixed to said ground line at spaced intervals, and a hook affixed to the free end of said gangions, said apparatus including:
    (a) a means for moving said ground line along an advancement path,
    (b) a hook guide track positioned adjacent said advancement path for capturing and guiding hooks along a guide path defined by said guide track, said guide track having an initial portion spaced from and nonparallel with said advancement path and a primary portion smoothly joined with said initial portion and running adjacent to said advancement path, (c) an improved hook capturing means located immediately upstream from said initial portion of said guide track comprising:

hook turning means upstream from and adjacent the initial portion of said hook guide track for orienting said hook such that the shank of said hook passes between said hook guide track and said advancement path and such that the point of said hook passes on the opposite side of said hook guide track, thereby allowing said hook guide track to engage the interior of said hook bend and capture said hook, said hook turning means defining a hook engaging surface having a first edge defining the downstream boundary of said hook engaging surface, said first edge terminating adjacent the oposite side of said guide track, said hook engaging surface extending upstream from said first edge and adjacent to said advancement path, said hook engaging surface defining a slot extending from said first edge to and through said advancement path, said slot being an open pathway for the shank of said hook so that said hook is free to rotate about the shank without downward pressure on the shank.

2. The improvement of claim 1 further comprising:
a means for mounting said hook engaging surface for swinging movement so that said first edge can swing downstream and towards said advancement path while swinging away from said guide track.

3. In an apparatus for handling longline, said longline including a ground line, a plurality of gangions affixed to said ground line at spaced intervals, and a hook affixed to the free end of said gangions, said apparatus including:

(a) a means for moving said ground line along an advancement path, (b) a hook guide track positioned adjacent said advancement path for capturing and guiding hooks along a guide path defined by said guide track, said guide track having an initial portion spaced from and nonparallel with said advancement path and a primary portion smoothly joined with said initial portion and running adjacent said advancement path, (c) an improved hook capturing means located immediately upstream from said initial portion of said guide track comprising:

hook turning means upstream from and adjacent the initial portion of said hook guide track for orienting said hook such that the shank of said hook passes between said hook guide track and said advancement path and such that the point of said hook passes on the opposite side of said hook guide track, thereby allowing said hook guide track to engage the interior of said hook bend and capture said hook, said hook turning means defining a hook engaging surface having a first edge defining the downstream boundary of said hook engaging surface, said first edge terminating adjacent the opposite side of said guide track, said hook engaging surface extending upstream from said first edge and adjacent said advancement path, said hook engaging surface defining a slot extending from said first edge to and through said advancement path, said slot being an open pathway for the shank of said hook so that said hook is free to rotate about the shank without downward pressure on the shank, said hook engaging surface having a first and a second half, said first half being split from said second half along a line forming an extension of said slot.

4. In an apparatus for handling longline, said longline including a ground line, a plurality of gangions affixed to said ground line at spaced intervals, and a hook affixed to the free end of said gangions, said apparatus including:

(a) a means for moving said ground line along an advancement path, (b) a hook guide track positioned adjacent said advancement path for capturing and guiding hooks along a guide path defined by said guide track, said guide track having an initial portion spaced from and nonparallel with said advancement path and a primary portion smoothly joined with said initial portion and running adjacent to said advancement path, (c) an improved hook capturing means located immediately upstream from said initial portion of said guide track comprising:

hook turning means upstream from and adjacent the initial portion of said hook guide track for orienting said hook such that the point of said hook passes between said hook guide track and said advancement path and such that the point of said hook passes on the opposite side of said hook guide track, thereby allowing said hook guide track to engage the interior of said hook bend and capture said hook, said hook turning means defining a hook engaging surface having a first edge defining downstream the boundary of said hook engaging surface, said first edge terminates adjacent the opposite side of said guide track, said hook engaging surface extending upstream from said first edge and adjacent to said advancement path, said hook engaging surface defining a slot extending from said first edge to and through said advancement path, said hook engaging surface having a first and a second half, said first half being split from said second half along a line forming an extension of said slot; and mounting means for mounting at least one of said halves for swinging movement so that the lower edge of said one of said halves can swing downstream and toward said advancement path while swinging away from said guide track.

5. The improvement of claim 1 wherein said first edge is substantially parallel to said initial portion of said guide track.

6. The improvement of claim 1 wherein said guide track is positioned below said advancement path, said improvement further comprising: means for positioning said gangion and said hook adjacent said advancement path at a location immediately upstream of said hook engaging surface.

7. In an apparatus for handling longline, said longline including a ground line, a plurality of gangions affixed to said ground line at spaced intervals, and a hook affixed to the free end of said gangions, said apparatus including:

(a) a means for moving said ground line along an advancement path, (b) a hook guide track positioned adjacent and below said advancement path for capturing and guiding hooks along a guide path defined by said guide track, said guide track having an initial portion spaced from and nonparallel with said advancement path and a primary portion smoothly joined with said initial portion and running adjacent and below said advancement path, (c) an improved hook capturing means located immediately upstream from said initial portion of said guide track comprising:

hook turning means upstream from and adjacent the initial portion of said hook guide track for orienting said hook such that the shank of said hook passes between said hook guide track and said advancement path and such that the point of said hook passes on the opposite side of said hook guide track, thereby allowing said hook guide track to engage the interior of said hook bend and capture said hook, said hook turning means defining a hook engaging surface having a first edge defining the downstream boundary of said hook engaging surface, said first edge terminating adjacent the opposite side of said guide track, said hook engaging surface extending upstream from said first edge and adjacent said advancement path, said hook engaging surface defining a slot extending from said first edge to and through said advancement path, said slot being an open pathway for the shank of said hook so that said hook is free to rotate about the shank without downward pressure on the shank; and means for positioning said gangion and said hook adjacent said advancement path at a location immediately upstream of said hook engaging surface, said means for positioning comprising a ramp that curves both upwardly and in a downstream direction, said ramp terminating in a forward edge spaced upstream from said first edge.

8. In an apparatus for handling longline, said longline including a ground line, a plurality of gangions affixed to said ground line at spaced intervals, and a hook affixed to the free end of said gangions, said apparatus including:

(a) a means for moving said ground line along an advancement path, (b) a hook guide track positioned adjacent and below said advancement path for capturing and guiding hooks along a guide path defined by said guide track, said guide track having an initial portion spaced from and nonparallel with said advancement path and a primary portion smoothly joined with said initial portion and running adjacent and below said advancement path, (c) an improved hook capturing means located immediately upstream from said initial portion of said guide track comprising:

hook turning means upstream from and adjacent the initial portion of said hook guide track for orienting said hook such that the shank of said hook passes between said hook guide track and said advancement path and such that the point of said hook passes on the opposite side of said hook guide track, thereby allowing said hook guide track to engage the interior of said hook bend and capture said hook, said hook turning means defining a hook engaging surface having a first edge defining the downstream boundary of said hook engaging surface, said first edge terminating adjacent the opposite side of said guide track, said hook engaging surface extending upstream from said first edge and adjacent said advancement path, said hook engaging surface defining a slot extending from said first edge to and through said advancement path, said slot being an open pathway for the shank of said hook so that said hook is free to rotate about the shank without downward pressure on the shank; and means for positioning said gangion and said hook adjacent said advancement path at a location immediately upstream of said hook engaging surface, said means for positioning comprising a ramp that curves both upwardly and in a downstream direction, said ramp terminating in a forward edge spaced upstream and by distance slightly greater than the distance between the bend and the point of said hook from said first edge.

9. The improvement of claim 7 wherein said forward edge and said initial portion of said guide track are spaced by a distance slightly less than the distance between the eye and the bend of said hook.

10. The improvement of claim 1 wherein the distance between said first edge and said initial portion of said guide track is less than the distance between the point and the bend of said hook.

11. The improvement of claim 10 wherein said distance is greater than the diameter of said hook at the bend of said hook.

12. The improvement of claim 11 wherein said initial portion of said guide track is immediately adjacent and spaced from at least a portion of said first edge.

13. The improvement of claim 12 wherein said first edge is substantially parallel to said initial portion of said guide track.

14. The improvement of claim 1 further comprising:
brush means positioned upstream from said hook engaging surface, said brush having bristles oriented transversely to said advancement path and terminate at a location adjacent said first edge.

15. In an apparatus for handling longline, said longline including a ground line, a plurality of gangions affixed to said ground line at spaced intervals, and a hook affixed to the free end of said gangions, said apparatus including:

(a) a means for moving said ground line along an advancement path, (b) a hook guide track positioned adjacent said advancement path for capturing and guiding hooks along a guide path defined by said guide track, said guide track having an initial portion spaced from and nonparallel with said advancement path and a primary portion smoothly joined with said initial portion and running adjacent said advancement path, (c) an improved hook capturing means located immediately upstream from said initial portion of said guide track comprising:

hook turning means upstream from and adjacent the initial portion of said hook guide track for orienting said hook such that the shank of said hook passes between said hook guide track and said advancement path and such that the point of said hook passes on the opposite side of said hook guide track, thereby allowing said hook guide track to engage the interior of said hook bend and capture said hook, said hook turning means defining a hook engaging surface having a first edge defining the downstream boundary of said hook engaging surface, said first edge terminating adjacent the opposite side of said guide track, said hook engaging surface extending upstream from said first edge and adjacent said advancement path, said hook engaging surface defining a slot extending from said first edge to and through said advancement path, said slot being an open pathway for the shank of said hook so that said hook is free to rotate about the shank without downward pressure on the shank; and brush means positioned upstream from said surface, said brush having bristles oriented transversely to said advancement path and terminating at a location adjacent said first edge, said bristles terminating upstream from said first edge.

16. In an apparatus for handling longline, said longline including a ground line, a plurality of gangions affixed to said ground line at spaced intervals, and a hook affixed to the free end of said gangions, said apparatus including:

(a) a means for moving said ground line along an advancement path, (b) a hook guide track positioned adjacent said advancement path for capturing and guiding hooks along a guide path defined by said guide track, said guide track having an initial portion spaced from and nonparallel with said advancement path and a primary portion smoothly joined with said initial portion and running adjacent said advancement path, (c) an improved hook capturing means located immediately upstream from said initial portion of said guide track comprising:

hook turning means upstream from and adjacent the initial portion of said hook guide track for orienting said hook such that the shank of said hook passes between said hook guide track and said advancement path and such that the point of said hook passes on the opposite side of said hook guide track, thereby allowing said hook guide track to engage the interior of said hook bend and capture said hook, said hook turning means defining a hook engaging surface having a first edge defining the downstream boundary of said hook engaging surface, said first edge terminating adjacent the opposite side of said guide track, said hook engaging surface extending upstream from said first edge and adjacent said advancement path, said hook engaging surface defining a slot extending from said first edge to and through said advancement path, said slot being an open pathway for the shank of said hook so that said hook is free to rotate about the shank without downward pressure on the shank; and means positioned adjacent at least one side of said slot and defining a projection extending away from said hook engaging surface in a downstream direction, said projection being positioned upstream from and extending slightly beyond the opposite side of said guide track for engaging the bend of said hook to assist in rotating said hook prior to its engagement with said guide track as said ground line moves along said advancement path.

17. The improvement of claim 1 wherein said first edge is so positioned relative to said initial portion to cause the point of a hook to engage the opposite side of said guide track.

18. The improvement of claim 15, wherein said guide track is positioned below said advancement path, said improvement further comprising a ramp for positioning said gangion and hook adjacent said advancement path at a location immediately upstream of said hook engaging surface, said ramp curving both upwardly and in a downstream direction, and terminating in a forward edge spaced upstream from said first edge.

* * * * *

UNITED STATES PATENT AND TRADEMARK OFFICE
CERTIFICATE OF CORRECTION

PATENT NO. : 4,750,285
DATED : June 14, 1988
INVENTOR(S) : Harold T. Cook, Jr.

It is certified that error appears in the above-identified patent and that said Letters Patent is hereby corrected as shown below:

Column 2, lines 60 & 61: "entracne" should be --entrance--
Column 8, line 28: "point" should be --shank--

Signed and Sealed this

First Day of November, 1988

Attest:

DONALD J. QUIGG

Attesting Officer

Commissioner of Patents and Trademarks